United States Patent [19]

Audeh et al.

[11] 4,439,310

[45] Mar. 27, 1984

[54] PETROLEUM PROCESSING WITH LOW ACIDITY CATALYST

[75] Inventors: Costandi A. Audeh; Eric J. Y. Scott, both of Princeton, N.J.

[73] Assignee: Mobil Oil Corporation, New York, N.Y.

[21] Appl. No.: 274,136

[22] Filed: Jun. 16, 1981

[51] Int. Cl.³ ...................... C10G 47/16; C10G 11/05
[52] U.S. Cl. ..................................... 208/111; 208/120
[58] Field of Search .............................. 208/111, 120

[56] References Cited

U.S. PATENT DOCUMENTS

| | | | |
|---|---|---|---|
| 3,725,243 | 4/1973 | Hass et al. | 208/59 |
| 4,257,872 | 4/1981 | La Pierre et al. | 208/111 |
| 4,257,874 | 3/1981 | Bergina | 208/111 |
| 4,261,861 | 4/1981 | Tu et al. | 208/120 |
| 4,263,129 | 4/1981 | Chen et al. | 208/111 |
| 4,269,697 | 5/1981 | Chen et al. | 208/120 |
| 4,312,743 | 1/1982 | Tu et al. | 208/120 |
| 4,315,814 | 2/1982 | Shihabi | 208/111 |

*Primary Examiner*—Delbert E. Gantz
*Assistant Examiner*—O. Chaudhori
*Attorney, Agent, or Firm*—Alexander J. McKillop; Michael G. Gilman; Laurence P. Hobbes

[57] ABSTRACT

A method for upgrading a high boiling hydrocarbon fraction by reducing the molecular weight of at least a portion of the waxy or non-waxy constituents of the fraction with a catalyst composed of a heat stable crystalline zeolite in a matrix comprising a degraded heat-sensitive crystalline zeolite.

15 Claims, 2 Drawing Figures

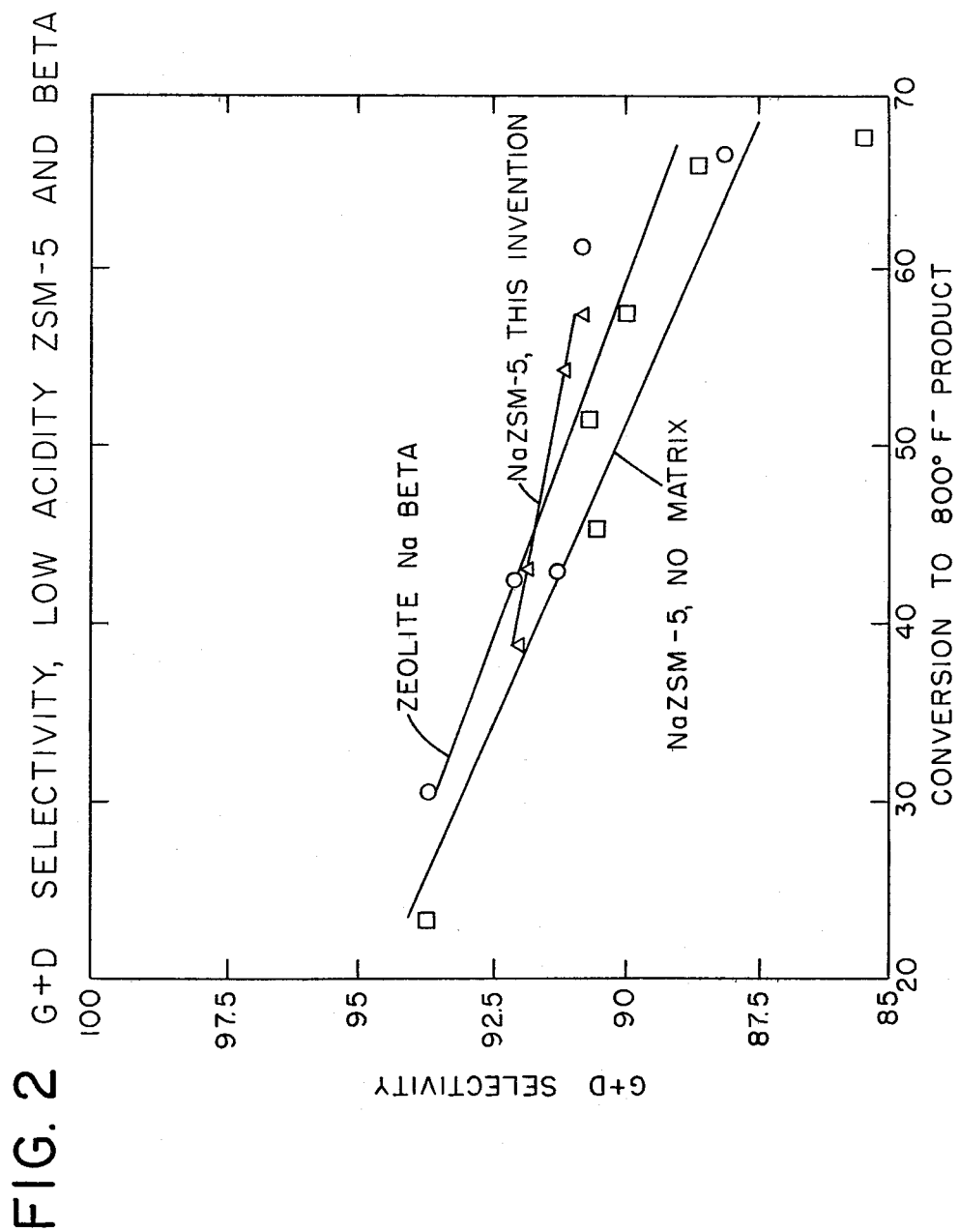
FIG. 2 G+D SELECTIVITY, LOW ACIDITY ZSM-5 AND BETA

PETROLEUM PROCESSING WITH LOW ACIDITY CATALYST

BACKGROUND OF THE INVENTION

1. Field of the Invention

This invention is concerned with upgrading relatively heavy hydrocarbon streams by converting a portion or all of the charge to lower molecular weight materials. Embodiments of this invention include cracking or hydrocracking of heavy petroleum fractions to produce gasoline and distillate, and catalytic dewaxing wherein the wax portion of the feed is selectively converted to lower molecular weight materials. All of these conversions involve "cracking" in the broadest sense of this term since all of these conversions depend on the conversion of hydrocarbon or substituted hydrocarbon molecules to products of lower molecular weight.

2. Background and Prior Art

Cracking may be nonspecific in that various types of molecules are converted, i.e., branched and straight chain aliphatics, naphthenes, aromatics, etc. The compounds so converted may also include other atoms in the molecule: metals, oxygen, sulfur and/or nitrogen. In particular processes, however, the intent may be to convert a certain class of compounds in order to modify a characteristic of the whole. Exemplary of the latter type of conversion is shape selective conversion of straight and slightly branched aliphatic compounds of 12 or more carbon atoms to reduce the pour point, the pumpability and/or the viscosity of heavy fractions which contain these waxy constituents. The long carbon chain compounds tend to crystallize on cooling the oil, and in many cases such cooled oil will not flow, hence may not be pumped or transported by pipelines. The temperature at which such mixture will not flow, which is determined by standarized test procedures, is designated the "pour point".

The pour point problem can be overcome by techniques known in the art for removal of waxes or conversion of those compounds to other hydrocarbons which do not crystallize at ambient temperatures. Shape-selective cracking or hydrocracking is an important method for so converting waxy hydrocarbons, utilizing principles described in U.S. Pat. No. 3,140,322 dated July 7, 1964. Zeolitic catalysts described in the literature for selective conversions of wax include such species as mordenite, with or without added metal to function as a hydrogenation catalyst.

Particularly effective catalysts for catalytic dewaxing include zeolite ZSM-5 and related porous crystalline aluminosilicates as described in U.S. Pat. No. Re. 28,398 (Chen et al.) dated Apr. 22, 1975. As described in that patent, drastic reductions in pour point are achieved by catalytic shape selective conversion of the wax content of heavy stocks with hydrogen in the presence of a dual-functional catalyst of a metal plus the hydrogen form of ZSM-5. The conversion of waxes is by scission of carbon to carbon bonds (cracking) and production of products of lower boiling point than the waxes. However, in many instances only a small portion of the charge is converted in dewaxing. For example, Chen et al. describe hydrowaxing of a full range shale oil having a pour point of +80° F. to yield a pumpable product of pour point at −15° F. The conversion of materials from the fraction heavier than light fuel oil to lighter components was in the neighborhood of 9%.

Among the less selective techniques for producing products of lower molecular weight than the hydrocarbon charge stock are catalytic cracking and catalytic hydrocracking. Catalytic cracking involves contacting the heavy hydrocarbon charge with a porous acidic solid catalyst at elevated temperatures in the range of 850° to 1000° F. to yield the desired lower boiling liquid product of greater value than the liquid charge (e.g. motor gasoline) together with normally gaseous hydrocarbons and coke as by-products. Hydrocracking employs a porous acidic catalyst similar to that used in the catalytic cracking but associated with a hydrogenation component such as metals of Groups VI and VIII of the Periodic Table. An excess of hydrogen is supplied to the hydrocracking reactor under superatmospheric pressure at lower temperature than those characteristic of catalytic cracking, say about 650° F.

Since the introduction of zeolite catalysts as exemplified by U.S. Pat. No. 3,140,249, a large proportion of the capacity for catalytic cracking and hydrocracking has been converted to use of such highly active catalysts. The high activity zeolite catalysts are characterized by very low content of alkali metal. Sodium, for example, is present as a cation in synthetic faujasites by reason of their manufacture. Expensive ion exchange operations are carried out in the preparation of cracking and hydrocracking catalysts from synthetic faujasite to replace the sodium or other alkali metal by protons or polyvalent metal cations.

It has been recognized that such zeolites can function as catalysts when containing a moderate percentage of sodium. Thus Kimberlin and Gladrow U.S. Pat. No. Re. 26,188 exhibits data showing cracking activity of a faujasite from which only one-third of the sodium has been removed by ion exchange. The extremely high activity of such catalysts as zeolite ZSM-5 has been moderated for specialized purposes by using the zeolite in the partially sodium form. See, for example, U.S. Pat. No. 3,899,544.

Zeolite ZSM-5 preparation is described in U.S. Pat. No. 3,702,886 which also describes several processes in which the zeolite is an effective catalyst, including cracking and hydrocracking. That zeolite is shown to be prepared from a forming solution which contains organic cations, namely alkyl substituted ammonium cations, which occupy cationic sites of the zeolite after crystallization. It is conventional to remove the organic cations by burning in air at elevated temperature, after which ion-exchange with sodium or other cations may be effected.

In general, the principal products or by-products desired in cracking, hydrocracking and related processes are relatively low-boiling liquids such as motor gasoline, diesel fuel, jet fuel, No. 2 fuel oil and the like, which liquids collectively will be referred to herein as gasoline plus distillate, or simply G+D. Gaseous products such as hydrogen, methane, ethane, propane, etc. represent degradation of a portion of the charge to less valuable fuels that the desired premium products. In addition to being less valuable fuels, these gases sequester high proportions of hydrogen, thus depriving other fuel fractions of what is ordinarily a desirable component.

Ways have been sought to increase the G+D (gasoline plus distillate) selectivity in cracking and hydrocracking, with reduction of the amount of feed going to gases. In U.S. Pat. No. 4,263,129 issued Apr. 21, 1981, it is proposed to conduct hydrocracking, hydrodewaxing, and related processes with certain zeolites having a low acid activity as catalyst. The low acid activity is achieved by alkali metal exchange, although it may also be achieved by steaming or using zeolites of very high silica to alumina ratio. In particular, low acidity catalysts that have an acid activity measured by the alpha scale less than 10 are required, with an alpha value substantially lower than unity being preferred. In U.S. Pat. No. 4,284,529 it is proposed to conduct similar conversions but with low acidity catalysts prepared by alkali metal exchange followed by steaming. Both U.S. Pat. No. 4,263,129 and U.S. Pat. No. 4,284,529 use as catalyst crystalline zeolites having a silica to alumina ratio greater than 12. When used as described, the low acid activity catalysts produce reduced amounts of gaseous by-products compared with prior art catalyst, and, additionally require less frequent regeneration. The entire contents of U.S. Pat. No. 4,263,129 and of U.S. Pat. No. 4,284,529 are incorporated herein by reference.

The acid activity of zeolite catalysts is conveniently measured by the alpha scale described in an article published in Journal of Catalysis, Vol. VI, pp. 278–287 (1966), the entire content of which article is herein incorporated by reference. The alpha scale so described will be used herein to define activity levels.

Crystalline zeolites, as synthesized, are fine powders unsuited for direct use as catalyst in almost all instances. The powders may be compacted under high pressure to form tablets of acceptable particle size. As a practical matter, however, the manufacture of acceptable catalysts from zeolite powders usually is accomplished with the use of a matrix, i.e. a second substance which is chosen for ease of handling, cost, ability to impart good crush strength to the catalyst, as well as for other factors. Known matrix materials include clays, alumina, amorphous cogels of silica with alumina (silica-alumina), silica-titania, silica-magnesia, and silica-zirconia. Means for combining the zeolite with the matrix material and for forming catalyst of the correct particle size from the mixture are known to those skilled in the art of catalyst manufacture and need not be reviewed here.

It is an object of this present invention to provide a selective process for upgrading a hydrocarbon oil with reduced formation of gaseous by-product. It is a further object of this invention to provide a process wherein a high boiling hydrocarbon oil to be upgraded is contacted with a low acidity catalyst comprising a heat stable zeolite in a matrix of collapsed heat-sensitive zeolite. These and other objects will become apparent to one skilled in the art on reading this entire specification and the claims appended hereto.

SUMMARY OF THE INVENTION

This invention provides a process for upgrading a high boiling hydrocarbon fraction by reducing the molecular weight of at least a portion of the waxy or nonwaxy crackable constituents of the fraction. This is accomplished with unusually low formation of gaseous by-products, as more fully described hereinbelow, by employing as catalyst a heat stable crystalline zeolite in a matrix comprising a collapsed zeolite, also as more fully described hereinbelow. The catalyst is of the low acidity type and has an acid activity measured by the alpha scale of less than 10, and preferably less than unity.

BRIEF DESCRIPTION OF THE DRAWING

FIG. 2 Low Acidity forms of ZSM-5 and Beta.

DESCRIPTION OF PREFERRED EMBODIMENTS

Figure 1:
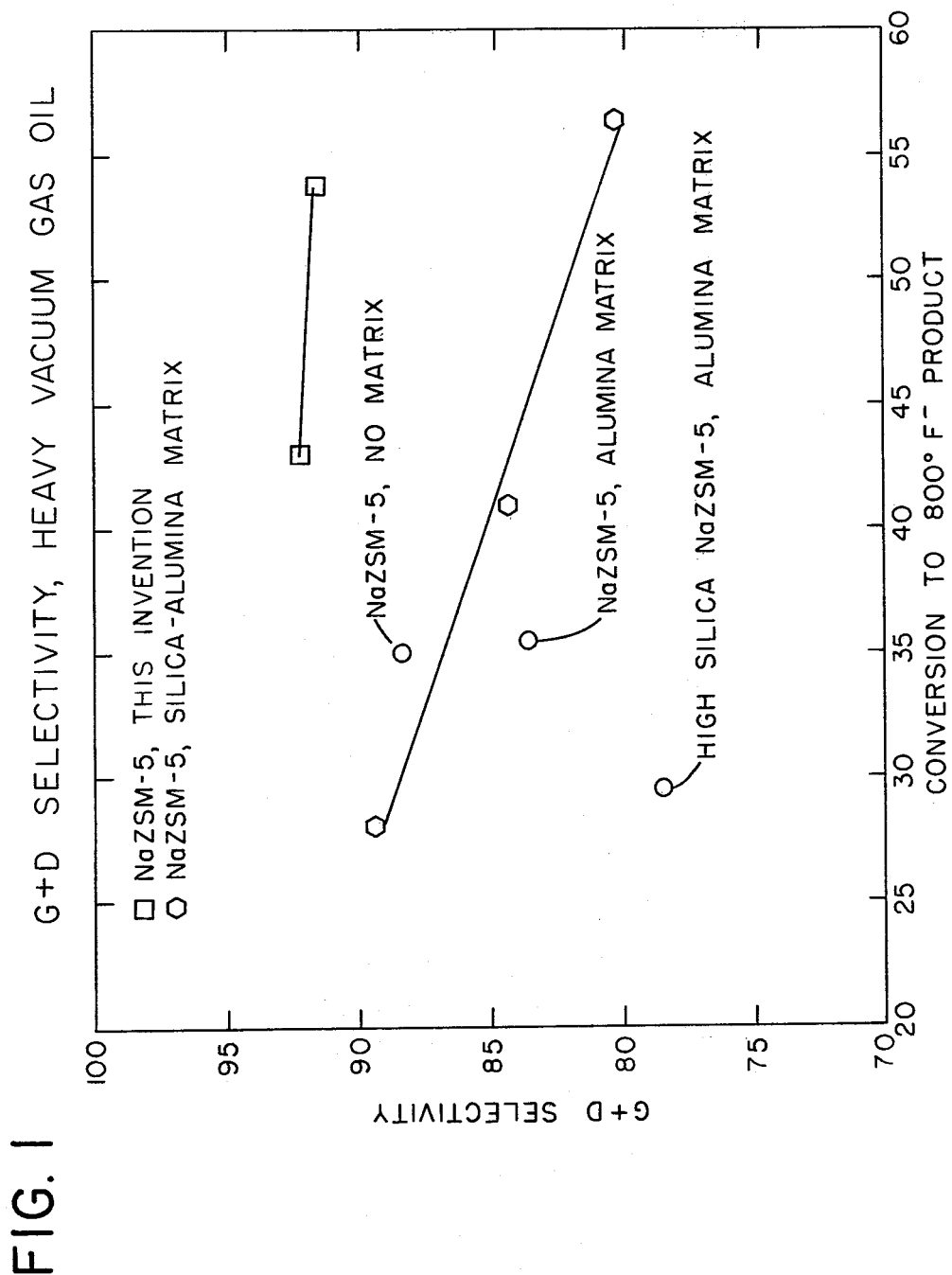
FIG. 1 G+D Selectivity vs. Conversion.

Feeds that may be upgraded by the process of this invention include high boiling hydrocarbon fractions that boil above about 400° F. Such feeds include, for example, distillate fractions of petroleum, such as light and heavy gas oil, vacuum tower gas oil, or even kerosine; and residual fractions such as atmospheric and vacuum tower residua. Other heavy hydrocarbonaceous oils are contemplated as suitable feeds. These include oil from tar sands, shale, and natural very heavy crudes. Also contemplated as suitable feeds are waxy crude oils or waxy fractions that have an unacceptably high pour point. By catalytic contact in accordance with the present invention, it is contemplated to reduce the pour point of such waxy oils to an acceptable level without an unacceptably high make of $C_4^-$ gases.

The low acidity catalysts of this invention are utilized under conditions similar to those employed in conventional hydrocracking although the catalyst need not contain a hydrogenation component as do true hydrocracking catalysts. The conversion is generally similar to that seen in hydrocracking with one very important difference, namely a highly advantageous low yield of gaseous hydrocarbons. That advantage is enhanced by a characteristically long on-stream life of the catalyst.

For installations having hydrogen available, it is preferred to operate the process under hydrogen pressure by the trickle technique with hydrogen flowing concurrently downward with mixed vapor and liquid phase hydrocarbons. In the absence of hydrogen, the process is preferably operated with a liquid-full reactor under sufficient pressure to maintain the hydrocarbons in the liquid phase.

Temperature of the reaction is between 650° F. and 850° F., preferably between 700° F. and 800° F. The activity of the catalyst drops off below about 700° F., making it advisable to operate at a temperature above about 700° F. Many charge stocks will undergo some thermal cracking at temperatures above about 800° F. with resultant production of undesired gaseous hydrocarbons thereby losing one advantage of the invention to the extent that thermal cracking takes place.

Pressures employed will vary according to the technique being used. For liquid full reactor operation, the minimum pressure will be that necessary to maintain the charge in liquid phase at the temperature of reaction. In any event, the pressure will be above about 200 psi. There appears to be no maximum pressure limit imposed by effectiveness of the catalyst, but costs for capital installation and operation of compressors and the like rise rapidly for pressures in excess of 2000 psi. For economic reasons, therefore, it is preferred to operate below about 2000 psi.

Space velocity will vary somewhat depending on the nature of the charge, the extent of conversion desired, and the conversion conditions. In general, space velocity will range from about 0.1 liquid volume of hydrocarbon charge per volume of catalyst per hour (LHSV) up to 5.0 LHSV. For most charge stocks, the preferable LHSV will range from about 0.3 to 1.0.

The present invention is based on the discovery that low acidity cracking catalysts of unusually good selectivity for gasoline plus distillate (G+D) are obtained when a heat-stable zeolite, exemplified by ZSM-5, is compounded with a non-crystalline siliceous oxide matrix which is formed by collapse of the crystal structure of a heat-sensitive crystalline zeolite. Thus, for use in the process of the present invention, the catalyst must contain (1) a heat-stable crystalline zeolite, and (2) a matrix that contains an amorphous siliceous oxide. The catalyst may contain 5 to 80% of the heat-stable zeolite, and 20 to 95% of the amorphous siliceous oxide. Other matrix-forming substances may be present, such as clays and inorganic oxides, but, in general, these must be selected and included only after adequate testing to avoid degrading the G+D selectivity of the catalyst.

In general, the heat-stable zeolite used in accordance with this invention is selected from a group of intermediate pore size crystalline zeolites with a silica-alumina ratio greater than 12 and a constraint index (C.I.) of 1 to about 12. Useful zeolites remain crystalline when heated at 600° C. even for prolonged periods such as 24 hours or much more. The C.I. is a measure of effective pore size, which is obtained by comparing the cracking rates for n-hexane and 3-methylpentane. The method for determining the C.I. is described in detail in Journal of Catalysis, Vol. 67, No. 1, January 1981, pp. 218–222, which description is herein incorporated by reference as if fully set forth. Suitable heat-stable crystalline zeolites include ZSM-5, ZSM-11, ZSM-12, ZSM-35 and ZSM-38, with ZSM-5 preferred.

U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

In preferred forms of the invention, the heat-stable zeolite contains no hydrogenation metal component, although hydrogen is preferably mixed with the charge when the mixed phase trickle mode of contact is employed. However, the invention contemplates catalyst blends in which the zeolite serves as a matrix for finely divided hydrotreating catalyst of conventional nature. Such hydrotreating catalysts are hydrogenation metal catalyst such as palladium, cobalt-molybdenum or nickel-tungsten on a porous alumina support, or on a large pore heat-stable zeolite such as hydrogen-Y.

It is known that not all synthetic crystalline zeolites may be dehydrated and heated to elevated temperatures without loss of the ordered framework structure characteristic of a crystalline zeolite. The heat-stable zeolites ZSM-5, ZSM-11 and the like are, in fact, unusually stable and resist loss of crystallinity even at temperatures well exceeding 600° C. At the other extreme, heat-sensitive crystalline zeolites may be synthesized which undergo collapse of crystal structure on heating just hot enough to induce dehydration of the crystal. For purposes of the present invention, any synthetic zeolite that suffers substantial loss of crystallinity when heated for one hour at 600° C. in air will be considered a member of the class of heat-sensitive crystalline zeolites that is useful as catalyst matrix precursors. For present purposes, a loss of about 50% or more of crystallinity on heating, as estimated by loss of X-ray peak height, in the usual manner, will constitute substantial loss of crystallinity.

Why a matrix comprising a collapsed heat-sensitive crystalline zeolite is advantageous in producing high G+D selectivity is not known. The collapsed framework is amorphous in the sense that long range order of atoms no longer is present, but the structure, which is essentially an amorphous siliceous oxide, may still have short range order or some other feature which is derived from its precursor crystals. This short range order may be responsible for its effectiveness which is shown in FIG. 1.

A particular variety of heat-sensitive crystalline zeolite useful as matrix precursor is described in U.S. patent application Ser. No. 156,902 filed June 6, 1980, now abandoned the entire content of which is incorporated herein by reference. The invention described in that patent application provides for synthesis of an unidentified crystalline zeolitic material which is heat-sensitive within the meaning of that term as herein specified. This unidentified crystalline material has the X-ray diffraction pattern shown in Table I.

TABLE I

| Interplanar Spacing d(A) | Relative Intensity I/Io |
|---|---|
| 15.70 | 100 |
| 8.01 | 2 |
| 7.77 | 8 |
| 7.25 | 5 |
| 7.09 | 2 |
| 5.64 | 2 |
| 5.18 | 13 |
| 5.01 | 8 |
| 4.91 | 4 |
| 4.59 | 3 |
| 4.47 | 8 |
| 4.36 | 3 |
| 4.14 | 2 |
| 4.00 | 4 |
| 3.90 | 2 |
| 3.63 | 17 |
| 3.54 | 24 |
| 3.44 | 70 |
| 3.30 | 41 |
| 2.21 | 14 |
| 2.15 | 44 |
| 2.99 | 2 |
| 2.87 | 3 |
| 2.82 | 3 |
| 2.73 | 1 |
| 2.64 | 3 |
| 2.61 | 2 |
| 2.59 | 3 |
| 2.53 | 2 |
| 2.42 | 1 |
| 2.35 | 4 |
| 2.31 | 2 |
| 2.28 | 2 |
| 2.06 | 1 |
| 1.87 | 1 |
| 1.84 | 3 |
| 1.83 | 11 |

The values shown in Table I for the unidentified heat-sensitive zeolite were determined by standard techniques. The radiation was the K-alpha doublet of copper and a diffractometer equipped with a scintillation counter and a strip chart recorder was used. The peak heights, I, and the positions as a function of 2 theta, where theta is a Bragg angle, were read from the diffractometer chart. From these, the relative intensities, 100 I/$I_o$, where $I_o$ is the intensity of the strongest line or peak, and d(obs), the interplanar spacing in A, corresponding to the recorded lines, were calculated.

As shown in Ser. No. 156,902, the heat-sensitive zeolite having the X-ray diffraction pattern herein described may be prepared either by itself or in admixture with a ZSM-5 type zeolite by crystallization from a silica and alumina (optional) gel mixture in the presence of organic nitrogen-N-oxides, such as trialkyl-amine-N-oxides or 4-picoline-N-oxide, with the alkyl group preferably comprising $C_2$-$C_5$ hydrocarbons. For example, with tripropyl-amine-N-oxide, a mixture of ZSM-5 and the heat-sensitive crystalline zeolitic material was obtained while the 4-picoline-N-oxide, only the heat-sensitive zeolitic material was formed. The gel compositions of the two crystallization modes are identical except for the choice of the organic component. These compositions, which are listed in Table II, are in the range of a conventional 70/1 $SiO_2/Al_2O_3$ ratio ZSM-5 preparation, and include a source of silica, optionally alumina, organic nitrogen-N-oxides ($R_2O$), an alkali metal oxide ($M_2O$), e.g., sodium, and water, and have a composition in terms of mole ratios of oxides as shown in the Table.

TABLE II

| FORMING SOLUTIONS | | |
|---|---|---|
| REACTANTS | BROAD | PREFERRED |
| $SiO_2/Al_2O_3$ | 10 to 300 | 50 to 90 |
| $M_2O/SiO_2$ | 0.01 to 3.0 | 0.1 to 1.0 |
| $R_2O/M_2O$ | 0.01 to 2.0 | 0.1 to 1.0 |
| $OH^-/SiO_2$ | 0 to 1.0 | 0.1 to 0.5 |

Another method for preparing a heat-sensitive crystalline zeolite either alone or in admixture with ZSM-5 is described in U.S. patent application Ser. No. 073,765 filed Sept. 10, 1979, now abandoned, the entire content of which is incorporated herein by reference as if fully set forth.

The inventors now wish to make clear that they do not regard hydrocarbon conversion as set forth herein with any low acidity catalyst as their invention, but that their invention is based on the discovery that unusually good G+D selectivity (which necessarily implies low $C_4^-$ gas make) is obtained when the matrix for the low acidity catalyst is the amorphous siliceous oxide described herein. The inventors have set forth a method for preparing the heat-sensitive crystalline precursor for the amorphous siliceous oxide, but it is contemplated that other methods and even other heat-sensitive crystalline precursors may be used without departing from the spirit of this invention. It is further contemplated that the precursor may be crystallized separately from the heat-stable crystalline zeolite and thereafter blended and heated to form the amorphous siliceous oxide matrix component; and that other potentially useful variants suggested by the discovery herein disclosed may be practiced.

The invention described above will now be illustrated by example. All parts and ratios given therein are by weight unless explicitly specified otherwise.

EXAMPLES

Example 1

A co-crystallized mixture of 61% ZSM-5 and about 39% of the heat-sensitive zeolite having the X-ray diffraction pattern specified herein was pelleted and calcined at 600° F. for 2 hours. The pellets were crushed and sized to 14/30 mesh, exhaustively base exchanged with sodium hydroxide solution and dried. A highly effective and preferred procedure for base exchange is described in U.S. patent application Ser. No. 151,018 filed May 19, 1980 (Attorney's Docket No. 0551) which is herein incorporated by reference. The acid activity measured by the alpha scale was less than 0.1. Arab Light heavy vacuum gas oil (boiling range 790°-1070° F.) was converted over the above catalyst to gasoline plus distillate at 750 psig, 4000 scf $H_2$/bbl, 770° F., and LHSV 0.2 and 0.3 hr.$^{-1}$ (based on total catalyst).

The results are shown in FIG. 1. For comparison, the data are shown for a 40% Na-exchanged ZSM-5 in 60% silica-alumina binder, NaZSM-5 with and without 35% alumina binder, and NaZSM-5 ($SiO_2/Al_2O_3=1600$). All runs were done under the pressure-temperature conditions described above and the LHSV (based on total catalyst) of 0.5 hr$^{-1}$ except for the NaZSM-5/silica alumina, for which the LHSV were 0.5, 0.3 and 0.2 hr$^{-1}$.

At a conversion of 50%, the gasoline+distillate selectivity is over 8% higher than for the sodium-exchanged ZSM-5/silica-alumina which had been prepared in the conventional way. The gas-make selectivity is less than 10%.

Example 2

Example 1 was repeated with a catalyst prepared by initially calcining at 600° C. instead of 600° F. for 2 hours. At LHSV=0.3 hr.$^{-1}$, the conversion was 40.3% and G+D selectivity was 91.6%, essentially confirming the results in Example 1.

The 800° F.+ fraction resulting from the conversion was found to have a pour point of 35° F., compared with 115° F. for the feed. Thus, the low acidity catalyst effectively dewaxed the residual oil in addition to converting a substantial fraction to more desirable products.

Example 3

The purpose of this example was to compare over a fairly wide range of conversion, a NaZSM-5 in amorphous siliceous oxide matrix according to this invention (alpha about 0.1), with a sodium exchanged large pore zeolite beta (alpha less than 0.1), and with a matrix-free NaZSM-5 (alpha less than 0.1). The feed was again Arab Light heavy vacuum gas oil, as in Example 1, and the temperature and pressure conditions were substantially the same, too. Conversion was varied by altering space velocity in all but one instance, for which temperature was increased by about 20° F.

The results are summarized in FIG. 2 of the drawing.

What is claimed is:

1. A process for upgrading a high boiling hydrocarbon oil, in which process, at least a portion of the waxy or non-waxy crackable constituents of said oil are cracked to normally liquid products of lower boiling range, which process comprises contacting said hydrocarbon oil with a catalyst of enhanced gasoline and distillate selectivity which is a heat-stable crystalline zeolite having a silica to alumina ratio greater than 12 and a constraint index of 1 to about 12 in a matrix comprising an amorphous siliceous oxide which is a thermally degraded heat-sensitive crystalline zeolite, said catalyst having an acid activity measured by the alpha scale of less than 10, with said contacting being conducted at 650 to 850 degrees F. and at a pressure not less than about 200 psi.

2. The process described in claim 1 wherein said heat-stable zeolite is selected from the group consisting of ZSM-5, ZSM-11, ZSM-12, ZSM-35 and ZSM-38.

3. The process described in claim 1 wherein the precursor to said degraded heat-sensitive crystalline zeolite has the x-ray diffraction pattern set forth in Table I herein.

4. The process described in claim 1 wherein said heat-stable zeolite comprises 5 to 80% by weight of said catalyst, and said amorphous siliceous oxide comprises 20 to 95% by weight of said catalyst.

5. The process described in claim 1 or claim 2 or claim 3 or claim 4 wherein said contacting is conducted in the presence of gaseous hydrogen.

6. The process described in claim 1 wherein said hydrocarbon oil is a waxy crude oil.

7. The process described in claim 2 wherein said catalyst has an acid activity measured by the alpha scale of less than unity.

8. The process described in claim 7 wherein said heat-sensitive crystalline zeolite has the X-ray diffraction pattern set forth herein.

9. The process described in claim 7 wherein said heat-stable zeolite comprises 5 to 80% by weight of said catalyst, and said amorphous siliceous oxide comprises 20 to 95% by weight of said catalyst.

10. The process described in claim 7 or claim 8 or claim 9 wherein said hydrocarbon oil is a waxy crude oil.

11. The process described in claim 7 or claim 8 or claim 9 wherein said heat stable crystalline zeolite is ZSM-5 and said contacting is conducted in the presence of gaseous hydrogen.

12. The process described in claim 1 wherein said heat-stable crystalline zeolite is in the alkali metal form and said acid activity measured by the alpha scale is less than about 1.

13. The process described in claim 1 or 2 or 3 or 4 or 6 or 7 or 8 or 9 or 12 wherein said heat-stable crystalline zeolite is in the sodium form and said acid activity measured by the alpha scale is less than about 0.2.

14. A process for dewaxing a hydrocarbon oil, which process comprises contacting said hydrocarbon oil with a catalyst of enhanced gasoline and distillate selectivity, which is a heat-stable crystalline zeolite having a silica to alumina ratio greater than 12 and a constraint index of 1 to about 12 in a matrix comprising an amorphous siliceous oxide which is a thermally degraded heat-sensitive crystalline zeolite, said catalyst having an acid activity measured by the alpha scale of less than about 1, with said contacting being conducted at 650 to 850 degrees F. and at a pressure not less than about 200 psi.

15. The process described in claim 14 wherein the heat-stable crystalline zeolite is ZSM-5.

* * * * *

UNITED STATES PATENT AND TRADEMARK OFFICE
CERTIFICATE OF CORRECTION

PATENT NO. : 4,439,310
DATED : March 27, 1984
INVENTOR(S) : COSTANDI A. AUDEH and ERIC J.Y. SCOTT It is certified that error appears in the above—identified patent and that said Letters Patent is hereby corrected as shown below:

Col. 6, line 30, Table I "7.77" should be --7.73--
Col. 6, line 44, Table I "2.21" should be --3.21--
Col. 6, line 45, Table I "2.15" should read -- 3.15 --.

Signed and Sealed this

Ninth Day of October 1984

[SEAL]

Attest:

Attesting Officer

GERALD J. MOSSINGHOFF
Commissioner of Patents and Trademarks